US010499335B2

(12) United States Patent
Huang et al.

(10) Patent No.: US 10,499,335 B2
(45) Date of Patent: *Dec. 3, 2019

(54) LOW-POWER WAKE-UP RECEIVER NEGOTIATION PROCEDURE

(71) Applicant: Intel IP Corporation, Santa Clara, CA (US)

(72) Inventors: Po-Kai Huang, San Jose, CA (US); Minyoung Park, San Ramon, CA (US)

(73) Assignee: Intel IP Corporation, Santa Clara, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/897,601

(22) Filed: Feb. 15, 2018

(65) Prior Publication Data

US 2018/0242250 A1    Aug. 23, 2018

Related U.S. Application Data

(63) Continuation of application No. 15/376,360, filed on Dec. 12, 2016, now Pat. No. 9,924,462.

(Continued)

(51) Int. Cl.
  *H04B 7/00*   (2006.01)
  *H04W 52/02*  (2009.01)
  *H04W 84/12*  (2009.01)

(52) U.S. Cl.
  CPC ... *H04W 52/0229* (2013.01); *H04W 52/0216* (2013.01); *H04W 84/12* (2013.01); *Y02D 70/00* (2018.01); *Y02D 70/10* (2018.01); *Y02D 70/12* (2018.01); *Y02D 70/124* (2018.01); *Y02D 70/126* (2018.01); *Y02D 70/1242* (2018.01); *Y02D 70/1262* (2018.01);
(Continued)

(58) Field of Classification Search
None
See application file for complete search history.

(56) References Cited

U.S. PATENT DOCUMENTS 9,100,813 B2   8/2015   Lovich et al.
9,924,462 B2   3/2018   Huang
(Continued)

OTHER PUBLICATIONS

"U.S. Appl. No. 15/376,360, Examiner Interview Summary dated Aug. 25, 2017", 3 pgs.
(Continued)

*Primary Examiner* — Sithu Ko
(74) *Attorney, Agent, or Firm* — Schwegman Lundberg & Woessner, P.A.

(57) ABSTRACT

Embodiments of a LP-WUR (low-power wake-up radio) negotiation procedure are generally described herein. A first wireless device encodes a request frame for transmission to a second wireless device, requesting to enable a LP-WUR mode and negotiate parameters for LP-WUR transmission between the first wireless device and the second wireless device. The first wireless device decodes a response action frame responsive to the request frame, indicating acceptance or rejection of the request. If the response action frame indicates acceptance of the request, the first wireless device: encodes an acknowledgement frame for transmission to the second wireless device, the acknowledgement frame to configure the second wireless device to enable the LP-WUR mode.

17 Claims, 5 Drawing Sheets

Related U.S. Application Data

(60) Provisional application No. 62/361,624, filed on Jul. 13, 2016.

(52) U.S. Cl.
CPC ............ *Y02D 70/14* (2018.01); *Y02D 70/142* (2018.01); *Y02D 70/144* (2018.01); *Y02D 70/146* (2018.01); *Y02D 70/164* (2018.01); *Y02D 70/166* (2018.01); *Y02D 70/20* (2018.01); *Y02D 70/22* (2018.01); *Y02D 70/26* (2018.01)

(56) References Cited

U.S. PATENT DOCUMENTS

| | | | |
|---|---|---|---|
| 2008/0095092 A1* | 4/2008 | Kim | H04W 52/287 370/311 |
| 2010/0254293 A1* | 10/2010 | Son | H04W 52/0216 370/311 |
| 2010/0271995 A1* | 10/2010 | Seok | H04W 52/0216 370/311 |
| 2014/0105082 A1* | 4/2014 | Sinha | H04W 52/0216 370/311 |
| 2014/0126442 A1 | 5/2014 | Jafarian et al. | |
| 2014/0208135 A1 | 7/2014 | Keil et al. | |
| 2014/0211678 A1* | 7/2014 | Jafarian | H04W 52/0216 370/311 |
| 2015/0223141 A1* | 8/2015 | Chatterjee | H04W 40/246 370/329 |
| 2016/0014773 A1 | 1/2016 | Seok | |
| 2016/0112954 A1 | 4/2016 | Amizur et al. | |
| 2016/0127997 A1* | 5/2016 | Ang | H04W 52/0216 370/311 |
| 2018/0041961 A1 | 2/2018 | Huang et al. | |

OTHER PUBLICATIONS

"U.S. Appl. No. 15/376,360, Non Final Office Action dated Aug. 10, 2017", 19 pgs.

"U.S. Appl. No. 15/376,360, Notice of Allowance dated Nov. 9, 2017", 13 pgs.

"U.S. Appl. No. 15/376,360, Response filed Sep. 5, 2017 to Non Final Office Action dated Aug. 10, 2017", 15 pgs.

"International Application Serial No. PCT/US2017/037304, International Search Report dated Sep. 12, 2017", 3 pgs.

"International Application Serial No. PCT/US2017/037304, Written Opinion dated Sep. 12, 2017", 8 pgs.

\* cited by examiner

LOW-POWER WAKE-UP RECEIVER NEGOTIATION PROCEDURE

PRIORITY CLAIM

This application is a continuation of U.S. patent application Ser. No. 15/376,360, filed Dec. 12, 2016 and entitled "LOW-POWER WAKE-UP RECEIVER NEGOTIATION PROCEDURE," which claims priority under 35 U.S.C. § 119 to U.S. Provisional Patent Application Ser. No. 62/361,624, filed Jul. 13, 2016, and titled, "LOW-POWER WAKE-UP RECEIVER (LP-WUR) NEGOTIATION PROCEDURE. The contents of these prior applications are considered part of this application, and are hereby incorporated by reference in their entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group. Some embodiments relate to a low-power wake-up radio (LP-WUR). Some embodiments relate to a LP-WUR negotiation procedure.

BACKGROUND

In recent years, applications have been developed relating to social networking, Internet of Things (IoT), wireless docking, and the like. It may be desirable to design low power solutions that can be always-on. However, constantly providing power to a wireless local area network (WLAN) radio may be expensive in terms of battery life.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
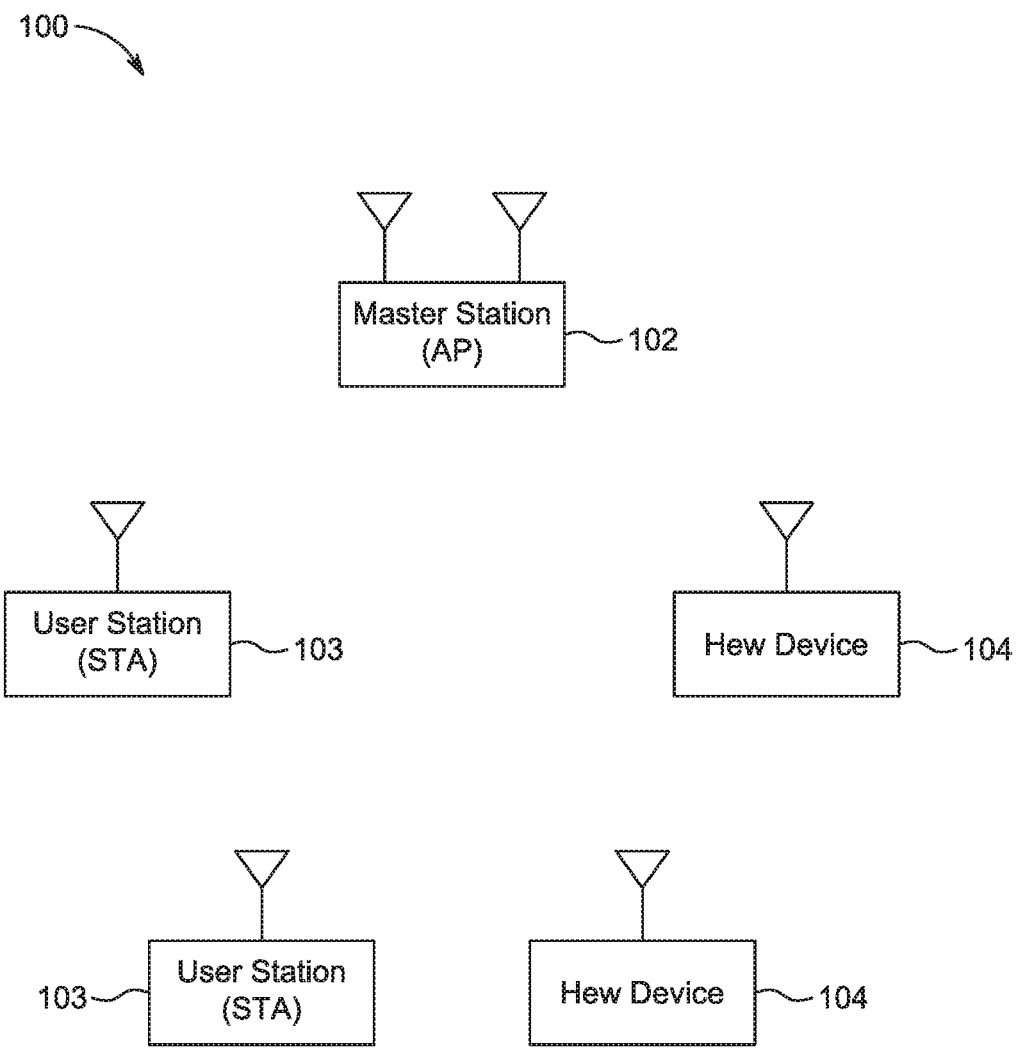
FIG. 1 illustrates a wireless network, in accordance with some embodiments.

FIG. 1 illustrates a wireless network in accordance with some embodiments. In some embodiments, the network 100 may be a High Efficiency Wireless (HEW) Local Area Network (LAN) network. In some embodiments, the network 100 may be a Wireless Local Area Network (WLAN) or a Wi-Fi network. These embodiments are not limiting, however, as some embodiments of the network 100 may include a combination of such networks. That is, the network 100 may support HEW devices in some cases, non HEW devices in some cases, and a combination of HEW devices and non HEW devices in some cases. Accordingly, it is understood that although techniques described herein may refer to either a non HEW device or to an HEW device, such techniques may be applicable to both non HEW devices and HEW devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HEW devices 104. In some embodiments, the AP 102 may transmit a trigger frame (TF) to an STA 103 to indicate that the STA 103 is to perform an uplink data transmission to the AP. In some embodiments, the AP 102 may transmit downlink data packets to the STA 103, and the STA 103 may transmit a block acknowledgement (BA) message for the downlink data packets. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HEW device 104 and/or other device may be configurable to operate as a master station. Accordingly, in such embodiments, operations that may be performed by the AP 102 as described herein may be performed by the STA 103, HEW device 104 and/or other device that is configurable to operate as the master station.

In some embodiments, one or more of the STAs 103 may be legacy stations. These embodiments are not limiting, however, as the STAs 103 may be configured to operate as HEW devices 104 or may support HEW operation in some embodiments. The master station 102 may be arranged to communicate with the STAs 103 and/or the HEW stations 104 in accordance with one or more of the IEEE 802.11 standards, including 802.11ax and/or others. In accordance with some HEW embodiments, an access point (AP) may operate as the master station 102 and may be arranged to contend for a wireless medium (e.g., during a contention period) to receive exclusive control of the medium for an HEW control period (i.e., a transmission opportunity (TXOP)). The master station 102 may, for example, transmit a master-sync or control transmission at the beginning of the HEW control period to indicate, among other things, which HEW stations 104 are scheduled for communication during the HEW control period. During the HEW control period, the scheduled HEW stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HEW control period, the master station 102 may communicate with HEW stations 104 using one or more HEW frames. During the HEW control period, STAs 103 not operating as HEW devices may refrain from communicating in some cases. In some embodiments, the master-sync transmission may be referred to as a control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HEW control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HEW stations 104 outside the HEW control period in accordance with legacy IEEE 802.11 communication techniques, although this is not a requirement.

In some embodiments, the HEW communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HEW communication may be configured for transmitting a number of spatial streams.

In some embodiments, high-efficiency wireless (HEW) techniques may be used, although the scope of embodiments is not limited in this respect. As an example, techniques included in 802.11ax standards and/or other standards may be used. In accordance with some embodiments, a master station 102 and/or HEW stations 104 may generate an HEW packet in accordance with a short preamble format or a long preamble format. The HEW packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
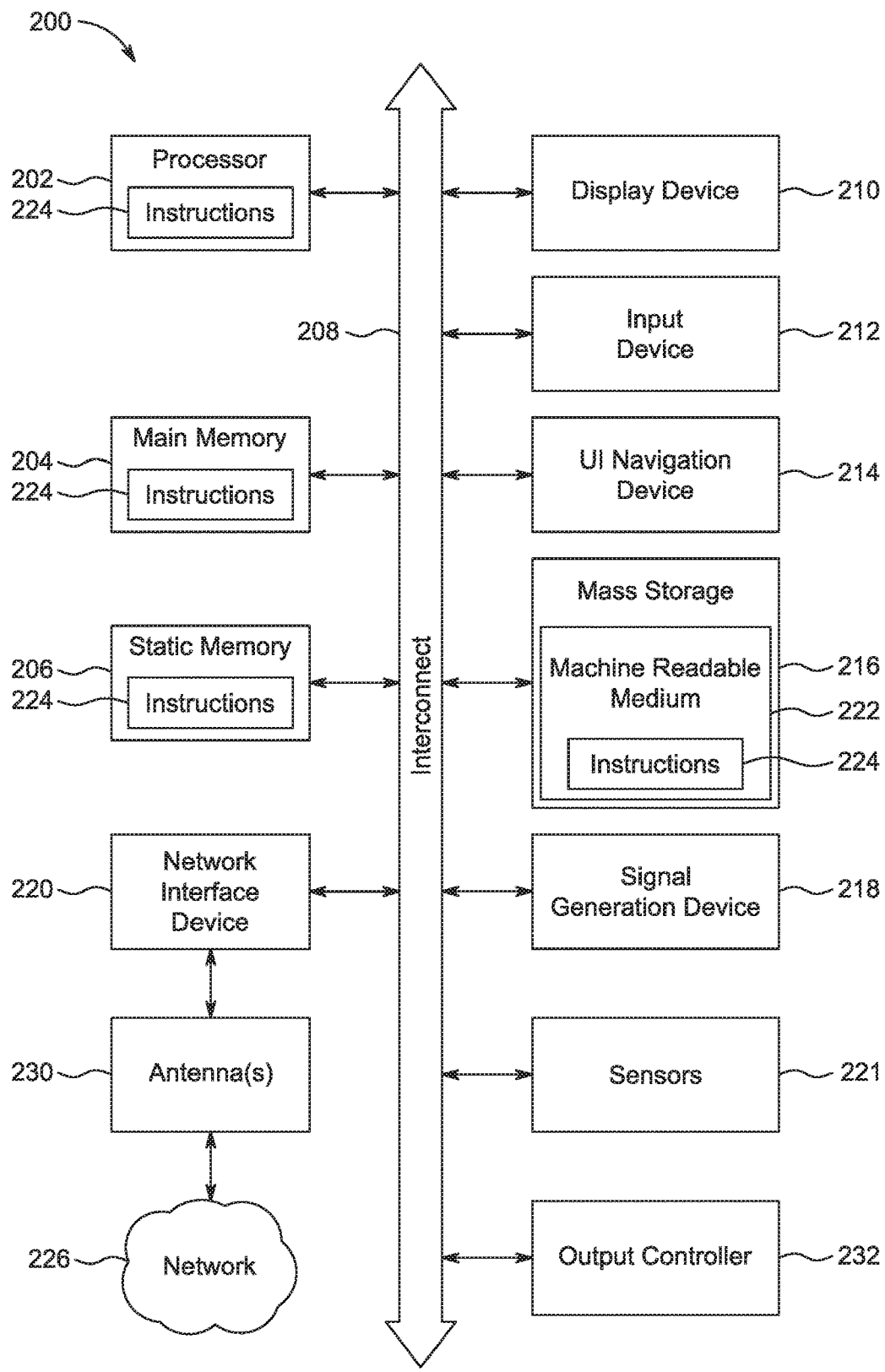
FIG. 2 illustrates an example machine, in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments in an example, the machine 200 may act as a peer machine in peer-to-peer (P2P) (or other distributed) network environment. The machine 200 may be an AP 102, STA 103, HEW device, HEW AP, HEW STA, UE, eNB, mobile device, base station, personal computer (PC), a tablet a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media, in some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
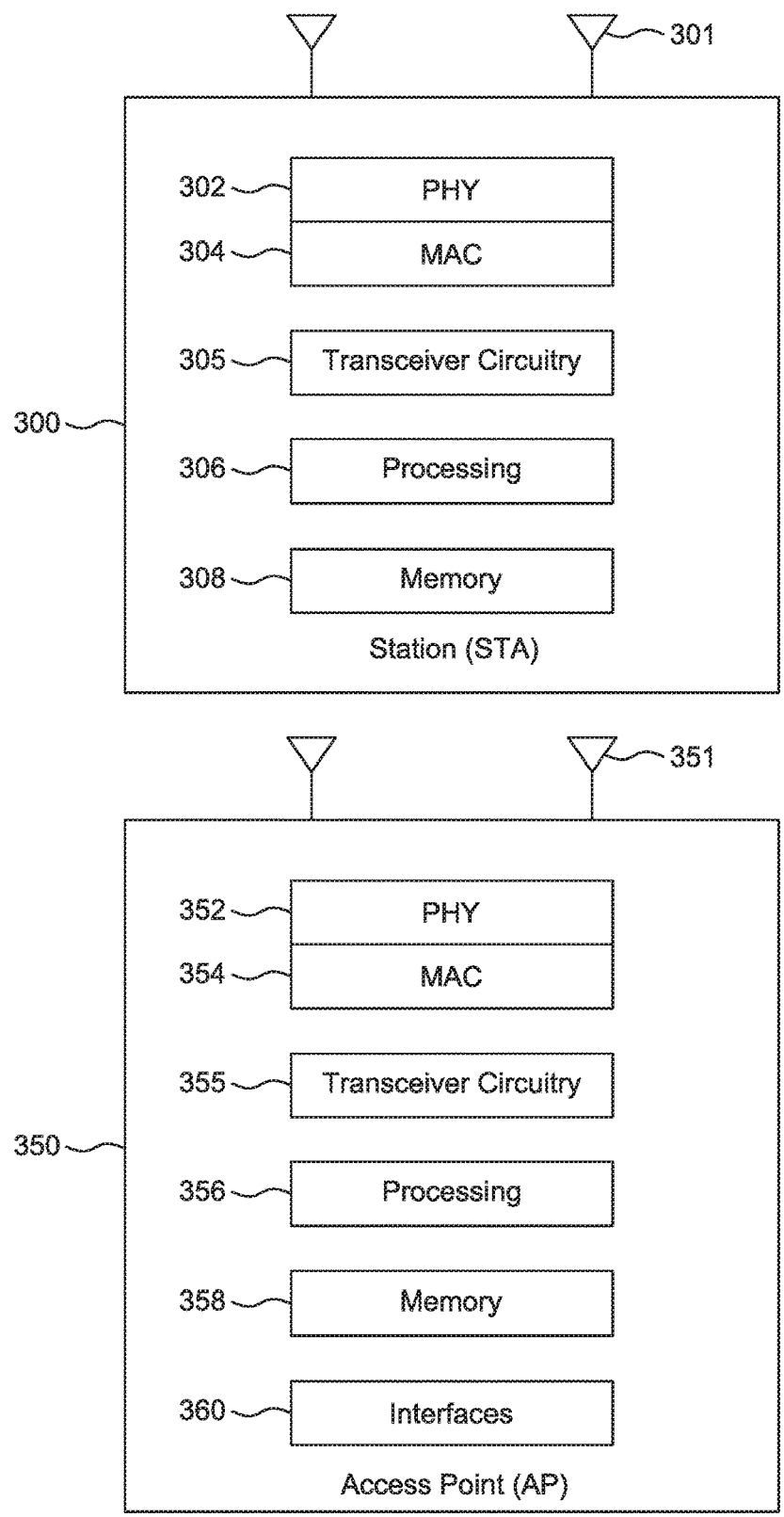
FIG. 3 illustrates a station (STA) in accordance with some embodiments and an access point (AP), in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control layer (MAC) circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control layer (MAC) circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HEW device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HEW device 104 may be configured to communicate using OFDM communication signals over a multicarrier communication channel. Accordingly, in some cases, the STA 300, AP 350 and/or HEW device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HEW standards, although the scope of the embodiments is not limited in this respect as they may also be suitable to transmit and/or receive communications in accordance with other techniques and standards. In some other embodiments, the AP 350, HEW device 104 and/or the STA 300 configured as an HEW device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In recent years, applications have been developed relating to social networking, Internet of Things (IoT), wireless docking, and the like. It may be desirable to design low power solutions that can be always-on. Multiple efforts are ongoing in the wireless industry to address this challenge. In some aspects, the subject technology uses the Wi-Fi alliance (WFA) neighbor aware networking (NAN) program to define a mechanism for Wi-Fi devices to maintain low power and achieve service discovery. In Bluetooth® Special Interest Group (SIG), Bluetooth® Low Energy provides a power-efficient protocol for some use cases. In the Institute of Electrical and Electronics Engineers (IEEE), low-power wake-up radio (LP-WUR) has gained a lot of interest. The idea of the LP-WUR is to utilize an extremely low power radio such that a device can be in listening mode with minimum capability and consume extremely low power. If the main radio is required for data transmission, a wake-up packet may be sent out by a peer device to wake up the main wireless local area network (WLAN) radio (e.g., Wi-Fi radio).

Figure 4:
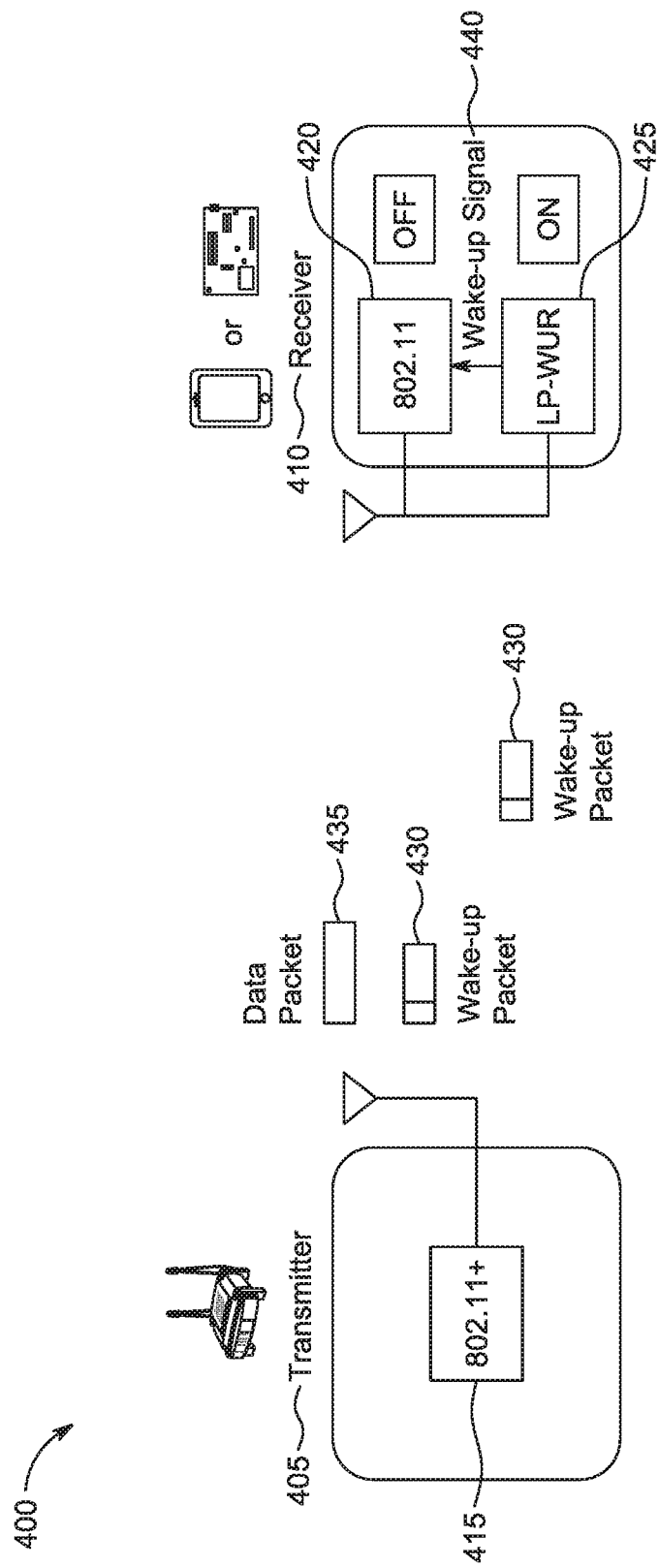
FIG. 4 illustrates an example system in which a low-power wake-up radio (LP-WUR) is operated, in accordance with some embodiments.

FIG. 4 illustrates an example system 400 in which a low-power wake-up radio is operated. As shown, the system 400 includes a transmitter 405 and a receiver 410. The transmitter 405 may be a WLAN station (e.g., Wi-Fi router) and the receiver 410 may be a computing device capable of connecting to the WLAN station, such as a mobile phone, a tablet computer, a laptop computer, a desktop computer, and the like. The transmitter 405 includes an WLAN (802.11+) radio 415. The receiver 410 includes a WLAN (802.11) radio 420 (e.g., Wi-Fi radio) and a LP-WUR 425. The WLAN radio 415 of the transmitter 405 transmits one or more wake-up packets 430. One of the wake-up packets 430 is received at the LP-WUR 425 of the receiver 420. Upon receiving the wake-up packet 430, the LP-WUR 425 sends a wake-up signal 440, which causes the WLAN radio 420 of the receiver 410 to turn on. The WLAN radio 415 of the transmitter 405 transmits data packet(s) 435 to the WLAN radio 420 of the receiver 410, and the WLAN radio 420 of the receiver 410 receives the data packet(s) 435.

As illustrated in FIG. 4, LP-WUR relates to a technique to enable ultra-low power operation for a Wi-Fi device (e.g., receiver 410). The idea is for the device to have a minimum radio configuration (e.g., LP-WUR 425) that can receive a wake-up packet 430 from the peer (e.g., transmitter 405). Hence, the device can stay in low power mode until receiving the wake-up packet 430.

The receiver 410 of the wake-up packet 430 may negotiate with the transmitter 405 of wake-up packet 430 before the receiver 410 enables the LP-WUR mode. Hence, the transmitter 405 knows the agreed bandwidth and channel in which to transmit the wake-up packet, the identification in the wake-up packet, and other related information. In some cases, the transmitter 405 may also send a response action frame with information to the receiver 410 before the receiver 410 enables the LP-WUR mode.

The receiver 410 of the wake-up packet 430 may inform the transmitter 405 of wake-up packet 430 before the receiver 410 enables the LP-WUR mode and turns off the WLAN radio 420. Hence, the transmitter 405 knows that wake-up packet 430 is allowed to transmit to the receiver 410. In some cases, the transmitter 405 may also send a response action frame with information to the receiver 410 before the receiver 410 enables the LP-WUR mode.

On the other hand, the transmitter 405 may be AP that regulates the power save operation in the base station subsystem (BSS). The receiver 410 may be a sensor, which has simple design and relies on AP to decide the power save mode. As a result, the AP may request the receiver 410 to enable or enable the LP-WUR mode, and the receiver 410 provides a response action frame accepting the request.

Some aspects of the subject technology define the LP-WUR request frame and response action frame. The LP-WUR request frame and response action frame may be similar to the wireless network management (WNM) sleep mode request/response in the Institute of Electrical and Electronics Engineers (IEEE) 802.11 specification.

Figure 5A:
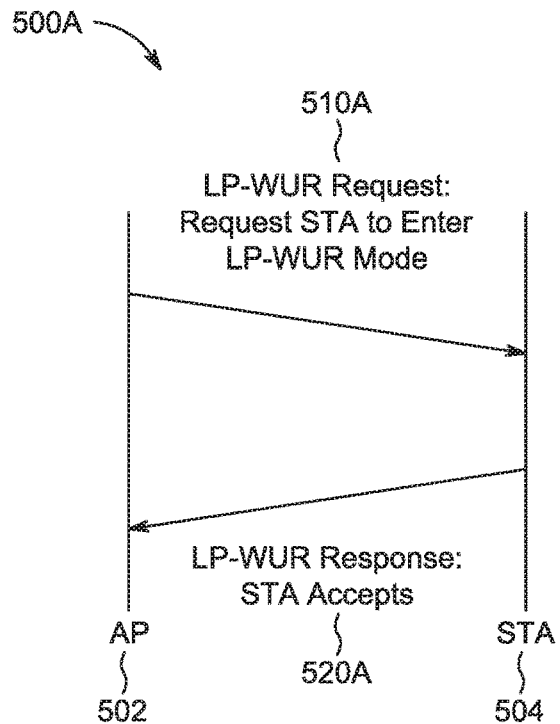
FIG. 5A is a data flow diagram illustrating an example method of an AP requesting for a STA to enable an LP-WUR mode, in accordance with some embodiments.
Figure 5B:
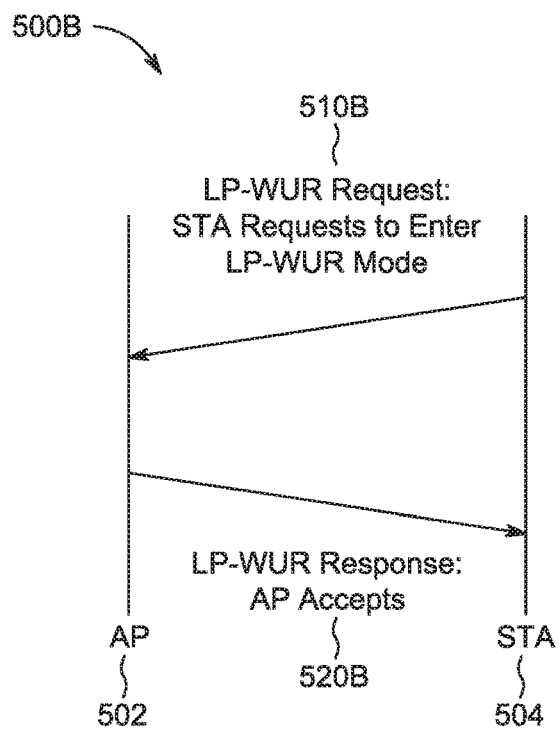
FIG. 5B is a data flow diagram illustrating an example method of a STA requesting to enable an LP-WUR mode from an AP.

In a BSS, the LP-WUR request frame can be sent by the non-AP STA or the AP STA. Then, the LP-WUR response action frame is sent by the AP STA or non-AP STA to accept/reject the request in the request frame. Examples are shown in FIGS. 5A-5B. FIGS. 5A-5B illustrate communications between an AP 502 and a STA 504.

FIG. 5A is a data flow diagram illustrating an example method 500A of the AP 502 requesting for the STA 504 to enable an LP-WUR mode, in accordance with some embodiments. At operation 510A, the AP 502 transmits to the STA 504 an LP-WUR request frame requesting for the STA 504 to enable the LP-WUR mode. At operation 520, the STA 504 transmits to the AP 502 the LP-WUR response action frame indicating that the STA 504 accepts the request in the request frame.

FIG. 5B is a data flow diagram illustrating an example method 500B of the STA 504 requesting to enable an LP-WUR mode from the AP 502. At operation 510B, the STA 504 transmits to the AP 502 a request frame to enable the LP-WUR mode. At operation 520B, the AP 502 transmits to the STA 504 the LP-WUR response action frame indicating that the AP 502 accepts the request in the request frame.

Some aspects of the subject technology enable the request frame to be sent from the AP 502 to allow a simple sensor at the STA 504 to give full control to the AP 502. Some aspects of the subject technology define additional information that may be placed in the request frame or the response action frame.

Aspects of the subject technology differentiate two procedures for LP-WUR. To enable/enable LP-WUR mode, a pair of STAs negotiate/setup the LP-WUR parameters and procedure. To enable LP-WUR mode, the wake-up packet receiver negotiates with the wake-up packet transmitter about the wake-up packet transmission parameters and related information. To enable the LP-WUR mode, the wake-up packet receiver informs the wake-up packet transmitter that the receiver has turned off 802.11 radio and has turned on the LP-WUR receiver on so that the transmitter can start to send the wake-up packet when the receiver needs to be waked up.

Aspects of the subject technology define the LP-WUR request frame and response action frame negotiation for a pair of STAs. The LP-WUR request frame and response action frame can be used by a pair of STAs to enable or enable LP-WUR mode. To enable LP-WUR mode, the LP-WUR request can be used by a STA to indicate if the STA itself (or a peer STA) is going to turn off the 802.11 radio and have the LP-WUR receiver turned on.

In some cases, STA1 is the wake-up packet transmitter (e.g., transmitter 405) and STA2 is the wake-up packet receiver (e.g., receiver 410). Aspects of the subject technology define two procedures for STA1 and STA2 to enable LP-WUR modes.

According to a first procedure, STA2 sends the LP-WUR request to STA1 in order to request for enabling LP-WUR mode between STA1 and STA2. STA1 sends the LP-WUR response in response to the request from STA2 to enable the LP-WUR mode between STA1 and STA2. STA2 enables the LP-WUR mode after receiving the response which indicates acceptance. STA2 does not enables the LP-WUR mode after receiving the response which indicates rejection. If the response indicates acceptance, STA1 enables the LP-WUR mode after receiving, from STA2, an acknowledgement (ACK) for the LP-WUR response.

According to a second procedure, STA1 sends the LP-WUR request to request STA2 to enables the LP-WUR mode between STA1 and STA2. In response to the request from STA1, STA2 sends an LP-WUR response indicating acceptance or rejection. If the response indicates acceptance, STA1 enables the LP-WUR mode and STA2 enables the LP-WUR mode after receiving an ACK of the response from STA1. If the response indicates rejection, STA2 does not enable the LP-WUR mode.

The first and second procedures, set forth above, may be differentiated by an explicit approach where one bit in the LP-WUR request indicates if the requester is the wake-up packet transmitter or receiver. Alternatively, an implicit approach may be used. According to the implicit approach: (i) if the request is sent from a non-AP STA to an AP STA, then the request is a self-request for the non-AP STA to be a wake-up packet receiver; and (ii) if the request is sent from an AP STA to a non-AP STA, then the request is a request for the non-AP STA to be a wake-up packet receiver. It should be noted that the implicit approach may not work for peer-to-peer (e.g., device-to-device or sidelink) situations.

Aspects of the subject technology define further information that can be sent in the LP-WUR request frame and response action frame. Specifically, an element associated with the request frame or the response action frame may be defined for LP-WUR.

The element may include STA2 identification in the wake-up packet. The identification may be placed in the LP-WUR request frame or response action frame from STA1.

The element may include STA1 identification in the wake-up packet. The identification may be placed in the LP-WUR request frame or response action frame from STA1. If STA1 is the access point, then the identification may be the BSS color.

The element may include broadcast identification in the wake-up packet. The identification for every STA (negotiated LP-WUR mode with the wake up packet transmitter) may be placed in the wake-up packet. The identification may be placed in the LP-WUR request frame or response action frame from STA1. If specific station IDs are assigned during the request frame or response action frame from STA1, then the broadcast identification may be an all 1 flag or all 0 flag.

The element may include group identification in the wake-up packet. The identification for a group of STAs (negotiated LP-WUR mode with the wake up packet transmitter) may be placed in the wake up packet. The identification may be placed in the LP-WUR request frame or response action frame from STA1.

The element may include the time for STA2 to turn the 802.11 radio (e.g., 802.11 radio 420) from off to on after receiving the wake-up packet at the LP-WUR (e.g., LP-WUR 425). The time may be placed in the request frame or response action frame from STA2. The required time may be indicated when STA1 and STA2 exchange LP-WUR capability information during association.

The element may include identification of STA2 requirements regarding the wake-up packet from STA1. STA2 requirements regarding the wake-up packet from STA1 may be placed in the LP-WUR request frame or response action frame.

The element may include STA2 periodic wake-up interval information for STA2 to periodically wake up the WLAN radio of STA2. The STA2 periodic wake-up interval information may be placed in the LP-WUR request frame or response action frame from STA2. Alternatively, the STA2 periodic wake-up interval information may be placed in the LP-WUR request frame or response action frame from STA1. The unit of the periodic wake-up interval may be a delivery traffic indication message (DTIM) beacon interval or a beacon interval. The STA2 periodic wake-up interval information may include an indication of the number of times for periodic wake-up.

In addition, the LP-WUR request frame may be used by a STA (e.g., STA2) to indicate that the STA requests to turn off its WLAN radio because it has its LP-WUR turned on. The LP-WUR request frame may be used by a STA (e.g., STA1) to request that a peer STA (e.g., STA2) turn off its WLAN radio and turn on its LP-WUR.

Aspects of the subject technology are described below using various examples.

Example 1 is an apparatus of a first wireless device, the apparatus comprising: memory; and processing circuitry, the processing circuitry to: encode a request frame for transmission to a second wireless device, the request frame comprising a request for the second wireless device to enable a LP-WUR (low-power wake-up radio) mode; decode a response action frame responsive to the request frame, the response action frame indicating acceptance or rejection of the request and an amount of time for a LP-WUR of the second wireless device to turn on a WLAN (wireless local area network) radio of the second wireless device or a periodic wake-up interval of the WLAN radio of the second wireless device; if the response action frame indicates acceptance of the request: encode an acknowledgement frame for transmission to the second wireless device, the acknowledgement frame to configure the second wireless device to enable the LP-WUR mode; and encode for transmission, to a LP-WUR of the second wireless device, of a wake-up packet to wake up a WLAN radio of the second wireless device at a time determined based on the amount of time or the periodic wake-up interval in the response action frame; and if the response action frame indicates rejection of the request: determine that the second wireless device is not enabling the LP-WUR mode.

Example 2 is the apparatus of Example 1, wherein, in enabling the LP-WUR mode, processing circuitry of the second wireless device is to: set up parameters indicated in the request frame or the response action frame for a transmission from a LP-WUR transmitter to a LP-WUR receiver, and wherein the first wireless device comprises the LP-WUR transmitter and the second wireless device comprises the LP-WUR receiver.

Example 3 is the apparatus of Example 2, wherein the transmission from the LP-WUR transmitter to the LP-WUR receiver comprises the wake-up packet, and wherein the wake-up packet is configured to cause the second wireless device to wake up the WLAN radio of the second wireless device.

Example 4 is the apparatus of Example 1, wherein the request frame identifies the second wireless device, and wherein the response action frame identifies the first wireless device.

Example 5 is the apparatus of Example 1, wherein the request frame identifies a plurality of stations, including the second wireless device, intended to receive the request frame.

Example 6 is the apparatus of Example 1, wherein one bit in the request frame indicates that the request frame is for transmission from a LP-WUR transmitter and to a LP-WUR receiver.

Example 7 is the apparatus of Example 1, wherein the first wireless device is an access point (AP), and wherein the second wireless device is a non-AP station (STA).

Example 8 is the apparatus of Example 1, wherein the processing circuitry comprises a baseband processor.

Example 9 is the apparatus of Example 1, further comprising a WLAN (wireless local area network) radio to transmit the request to the second wireless device.

Example 10 is the apparatus of Example 9, wherein the WLAN radio is coupled with an antenna.

Example 11 is an apparatus of a first wireless device, the apparatus comprising: memory; and processing circuitry, the processing circuitry to: decode a request frame, the request frame comprising a request for enabling a LP-WUR (low-power wake-up radio) mode from a second wireless device, the request frame indicating an amount of time for a LP-WUR of the second wireless device to turn on a WLAN (wireless local area network) radio of the second wireless device or a periodic wake-up interval of the WLAN radio of the second wireless device; determine whether the first wireless device is able to enable the LP-WUR mode; if the first wireless device is able to enable the LP-WUR mode: provide a response action frame indicating acceptance of the request; cause the first wireless device to enable the LP-WUR mode in response to an acknowledgement, from the second wireless device, of the response action frame; and encode, at a LP-WUR of the first wireless device, a wake-up packet, to the second wireless device, to wake up a WLAN radio of the second wireless device at a time determined based on the amount of time or the periodic wake-up interval in the response action frame; and if the first wireless device is not able to enable the mode: provide a response action frame indicating rejection of the request.

Example 12 is the apparatus of Example 11, wherein, in enabling the LP-WUR mode, the processing circuitry is to: set up parameters indicated in the request frame or the response action frame for a transmission from a LP-WUR transmitter to a LP-WUR receiver, and wherein the first wireless device comprises the LP-WUR transmitter and the second wireless device comprises the LP-WUR receiver.

Example 13 is the apparatus of Example 12, wherein the transmission from the LP-WUR transmitter to the LP-WUR receiver comprises the wake-up packet, and wherein the wake-up packet is configured to cause the second wireless device to wake up the WLAN radio of the second wireless device.

Example 14 is the apparatus of Example 11, wherein the request frame identifies the second wireless device, and wherein the response action frame identifies the first wireless device.

Example 15 is the apparatus of Example 11, wherein the request frame identifies a plurality of stations, including the first wireless device, intended to receive the request frame.

Example 16 is the apparatus of Example 11, wherein one bit in the request frame indicates that the request frame is for transmission from a LP-WUR receiver and to a LP-WUR transmitter.

Example 17 is the apparatus of Example 11, wherein the second wireless device is a non-access point station, and wherein the first wireless device is an access point (AP).

Example 18 is a non-transitory machine-readable medium storing instructions for execution by processing circuitry of a first wireless device, the instructions causing the processing circuitry to: encode a request frame for transmission to a second wireless device, the request frame comprising a request for the second wireless device to enable a LP-WUR (low-power wake-up radio) mode; decode a response action frame responsive to the request frame, the response action frame indicating acceptance or rejection of the request and an amount of time for a LP-WUR of the second wireless device to turn on a WLAN (wireless local area network) radio of the second wireless device or a periodic wake-up interval of the WLAN radio of the second wireless device; if the response action frame indicates acceptance of the request: encode an acknowledgement frame for transmission to the second wireless device, the acknowledgement frame to configure the second wireless device to enable the LP-WUR mode; and encode for transmission, to a LP-WUR of the second wireless device, of a wake-up packet to wake up a WLAN radio of the second wireless device at a time determined based on the amount of time or the periodic wake-up interval in the response action frame; and if the response action frame indicates rejection of the request: determine that the second wireless device is not enabling the LP-WUR mode.

Example 19 is the machine-readable medium of Example 18, wherein, in enabling the LP-WUR mode, processing circuitry of the second wireless device is to: set up parameters indicated in the request frame or the response action frame for a transmission from a LP-WUR transmitter to a LP-WUR receiver, and wherein the first wireless device comprises the LP-WUR transmitter and the second wireless device comprises the LP-WUR receiver.

Example 20 is a method, implemented at a first wireless device, the method comprising: encoding a request frame for transmission to a second wireless device, the request frame comprising a request for the second wireless device to enable a LP-WUR (low-power wake-up radio) mode; decoding a response action frame responsive to the request frame, the response action frame indicating acceptance or rejection of the request and an amount of time for a LP-WUR of the second wireless device to turn on a WLAN (wireless local area network) radio of the second wireless device or a periodic wake-up interval of the MAN radio of the second wireless device; if the response action frame indicates acceptance of the request: encoding an acknowledgement frame for transmission to the second wireless device, the acknowledgement frame to configure the second wireless device to enable the LP-WUR mode; and encoding for transmission, to a LP-WUR of the second wireless device, of a wake-up packet to wake up a WLAN radio of the second wireless device at a time determined based on the amount of time or the periodic wake-up interval in the response action frame; and if the response action frame indicates rejection of the request: determining that the second wireless device is not enabling the LP-WUR mode.

Example 21 is the method of Example 20, wherein enabling the LP-WUR mode comprises: setting up parameters indicated in the request frame or the response action frame for a transmission from a LP-WUR transmitter to a LP-WUR receiver, and wherein the first wireless device comprises the LP-WUR transmitter and the second wireless device comprises the LP-WUR receiver.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wake-up radio (WUR) non-access point (non-AP) station (STA), the apparatus comprising: memory; and processing circuitry, the processing circuitry comprising a primary connectivity radio (PCR) and a WUR receiver, the processing circuitry configured to:

encode a request frame for transmission to a WUR access point (AP) station (STA), the request frame including a request to the WUR AP STA for the WUR non-AP STA to enter a WUR mode, the request frame further encoded to indicate a transition delay for the WUR non-AP STA to turn on the PCR, configure the non-AP STA to transmit the request frame, decode a response frame from the WUR AP STA, the response frame indicating acceptance or denial of the request, and decode a wake-up frame from the WUR AP STA, wherein the WUR receiver is configured to turn on the PCR in response to the decoding of the wake-up frame, wherein the processing circuitry is further configured to encode the request frame to further indicate duty cycle information for the PCR, and wherein the response frame further indicates a negotiated duty cycle of the WUR receiver, wherein the wake-up frame is received according to the negotiated duty cycle.

2. The apparatus of claim 1, wherein the processing circuitry is further configured to enter the WUR mode in response to the response frame indicating acceptance of the request.

3. The apparatus of claim 1, wherein the processing circuitry is further configured to not enter the WUR mode in response to the response frame indicating denial of the request.

4. The apparatus of claim 1, wherein the processing circuitry is further configured to operate the WUR receiver consistent with the negotiated duty cycle information.

5. The apparatus of claim 1, wherein the processing circuitry includes a receiver, the receiver including first processing circuitry configured as the PCR and separate second processing circuitry configured as the WUR receiver.

6. The apparatus of claim 1, wherein the processing circuitry comprises a baseband processor.

7. The apparatus of claim 1, wherein the primary connectivity radio comprises a WLAN (wireless local area network) radio, and the WLAN radio is configured to transmit the request to the WUR AP.

8. The apparatus of claim 7, wherein the WLAN radio is coupled with an antenna.

9. A method for a wake-up radio (WUR) non-access point (non-AP) station (STA), the method comprising:

encoding a request frame for transmission to a WUR access point (AP) station (STA), the request frame including a request to the WUR AP STA for the WUR non-AP STA to enter a WUR mode;

encoding the request frame to indicate a transition delay for the WUR non-AP STA to turn on a primary connectivity radio (PCR);

configuring the non-AP STA to transmit the request frame;

decoding a response frame from the WUR AP STA, the response frame indicating acceptance or denial of the request; and decoding, by a WUR receiver of the WUR non-AP STA, a wake-up frame from the WUR AP STA, turning on the PCR in response to the decoding of the wake-up frame, wherein the method further comprising encoding the request frame to indicate duty cycle information for the WUR receiver, the response frame further decoded to determine a negotiated duty cycle of the WUR receiver, wherein the wake-up frame is received by the WUR non-AP STA according to the negotiated duty cycle.

10. The method of claim 9, further comprising operating the WUR receiver consistent with the negotiated duty cycle information.

11. An apparatus of a wake-up radio (WUR) access point (AP) station (STA), the apparatus comprising: memory; and processing circuitry, the processing circuitry configured to:

decode a request frame from a WUR non-access point (non-AP) station (STA), the request frame including a request to the WUR AP STA for the WUR non-AP STA to enter a WUR mode, decode the request frame to determine a transition delay for the WUR non-AP STA to turn on a primary connectivity radio (PCR), encode a response frame for transmission to the WUR AP STA, the response frame encoded to indicate acceptance or denial of the request, configure the WUR AP to transmit the response frame, encode a wake-up frame for transmission to the WUR non-AP STA, and configure the WUR AP to transmit the wake-up frame in accordance with the transition delay, wherein the request frame further decoded to determine a duty cycle information for a WUR receiver of the WUR non-AP STA, the response frame further encoded to indicate a negotiated duty cycle of the WUR receiver of the WUR non-AP STA based on the duty cycle information indicated in the request frame, wherein the WUR AP is configured to transmit the wake-up frame in further accordance with the negotiated duty cycle.

12. The apparatus of claim 11, wherein the processing circuitry is further configured to encode the response indicating acceptance of the request.

13. The apparatus of claim 12, wherein the processing circuitry is further configured to enter the WUR mode for the WUR non-AP STA in response to acceptance of the request.

14. The apparatus of claim 11, wherein the processing circuitry is further configured to encode the response indicating denial of the request.

15. The apparatus of claim 11, wherein the processing circuitry comprises a baseband processor.

16. The apparatus of claim 11, further comprising a WLAN (wireless local area network) radio to transmit the response to the WUR non-AP.

17. The apparatus of claim 16, wherein the WLAN radio is coupled with an antenna.

* * * * *